United States Patent
Kang

(10) Patent No.: US 11,003,743 B2
(45) Date of Patent: May 11, 2021

(54) ACTIVE CONTENT PLAYBACK APPARATUS AND ACTIVE CONTENT CREATION APPARATUS

(71) Applicant: Sangmyung University Seoul Industry-Academy Cooperation Foundation, Seoul (KR)

(72) Inventor: Sang-ug Kang, Seoul (KR)

(73) Assignee: Sangmyung University Seoul Industry-Academy Cooperation Foundation, Seoul (KR)

( * ) Notice: Subject to any disclaimer, the term of this patent is extended or adjusted under 35 U.S.C. 154(b) by 227 days.

(21) Appl. No.: 16/263,491

(22) Filed: Jan. 31, 2019

(65) Prior Publication Data

US 2019/0163882 A1  May 30, 2019

Related U.S. Application Data

(63) Continuation-in-part of application No. 15/177,677, filed on Jun. 9, 2016, now abandoned.

(30) Foreign Application Priority Data

Jan. 12, 2016 (KR) .................. 10-2016-0003533
Dec. 19, 2018 (KR) .................. 10-2018-0165208

(51) Int. Cl.
- *G06F 21/12* (2013.01)
- *G06F 21/62* (2013.01)
- *G06F 9/54* (2006.01)
- *G06F 21/10* (2013.01)

(52) U.S. Cl.
CPC .............. *G06F 21/12* (2013.01); *G06F 9/54* (2013.01); *G06F 21/10* (2013.01); *G06F 21/6245* (2013.01); *G06F 2221/0704* (2013.01)

(58) Field of Classification Search
CPC ...... G06F 21/12; G06F 21/10; G06F 21/6245; G06F 9/54; G06F 2221/0704
USPC ........................................................ 726/28
See application file for complete search history.

(56) References Cited

U.S. PATENT DOCUMENTS

| | | | |
|---|---|---|---|
| 2002/0059522 A1 | 5/2002 | Hirano et al. | |
| 2002/0128972 A1 | 9/2002 | Stefik et al. | |
| 2002/0164047 A1 | 11/2002 | Yuval | |
| 2010/0205241 A1* | 8/2010 | Lin ................. | H04N 21/47805 709/203 |
| 2013/0097634 A1 | 4/2013 | Jin et al. | |
| 2015/0382081 A1* | 12/2015 | Reese ............... | H04N 21/854 386/282 |

(Continued)

FOREIGN PATENT DOCUMENTS

| | | |
|---|---|---|
| KR | 10-1258387 B1 | 4/2013 |
| KR | 10-1421666 B1 | 7/2014 |

*Primary Examiner* — Mohammad W Reza
(74) *Attorney, Agent, or Firm* — Rabin & Berdo, P.C.

(57) ABSTRACT

An active content playback apparatus according to the present invention includes a storage storing active content including an active content header, embedded content, and an engine code, and a player program for executing the content; a memory temporarily storing data and program; and a central processing unit loading the active content into the memory according to an execution request for the active content and controlling an execution through a process of the player program of the embedded content loaded into the memory by executing the engine code included in the active content.

12 Claims, 10 Drawing Sheets

(56) References Cited

U.S. PATENT DOCUMENTS

2016/0066027 A1   3/2016  Ellis et al.
2016/0085385 A1   3/2016  Gao et al.

\* cited by examiner

Table 2  The InML schema.

| Definition of main elements | Definition of submain elements |
|---|---|
| ① `<xs:schema xmlns:xs="http://www.w3.org/2001/XMLSchema" xmlns:mstns="http://tempuri.org/XMLSchema.xsd" elementFormDefault="qualified">`<br><br>`<xs:element name="InML">`<br>`  <xs:complexType>`<br>`    <xs:choice maxOccurs="unbounded">`<br>`      <xs:element name="intention" type="IntentionType"/>`<br>`    </xs:choice>`<br>`  </xs:complexType>`<br>`</xs:element>`<br><br>② `<xs:complexType name="IntentionType">`<br>`  <xs:sequence>`<br>`    <xs:element name="conditions" type="ConditionsType"/>`<br>`    <xs:element name="action" type="ActionType"/>`<br>`  </xs:sequence>`<br>`  <xs:attribute name="name" use="required">`<br>`    <xs:simpleType>`<br>`      <xs:restriction base="xs:string">`<br>`        <xs:enumeration value="play"/>`<br>`        <xs:enumeration value="print"/>`<br>`      </xs:restriction>`<br>`    </xs:simpleType>`<br>`  </xs:attribute>`<br>`</xs:complexType>`<br><br>③ `<xs:complexType name="ConditionsType">`<br>`  <xs:choice minOccurs="1" maxOccurs="unbounded">`<br>`    <xs:element ref="not"/>`<br>`    <xs:element ref="and"/>`<br>`    <xs:element ref="or"/>`<br>`    <xs:group ref="conditionsGroup" maxOccurs="1"/>`<br>`  </xs:choice>`<br>`</xs:complexType>` | `<xs:group name="conditionsGroup">`<br>`  <xs:choice>`<br>`    <xs:element name="time" type="TimeType" maxOccurs="unbounded"/>`<br>`    <xs:element name="quality" type="QualityType" maxOccurs="unbounded"/>`<br>`    <xs:element name="count" type="CountType" maxOccurs="unbounded"/>`<br>`    <xs:element name="address" type="AddressType" maxOccurs="unbounded"/>`<br>`  </xs:choice>`<br>`</xs:group>`<br><br>`<xs:complexType name="logicalExpressionType">`<br>`  <xs:choice minOccurs="1" maxOccurs="unbounded">`<br>`    <xs:element ref="not"/>`<br>`    <xs:element ref="and"/>`<br>`    <xs:element ref="or"/>`<br>`    <xs:group ref="conditionsGroup"/>`<br>`  </xs:choice>`<br>`</xs:complexType>`<br><br>`<xs:complexType name="TimeType">`<br>`  <xs:attribute name="from" type="xs:dateTime"/>`<br>`  <xs:attribute name="to" type="xs:dateTime"/>`<br>`  <xs:attribute name="not_from" type="xs:dateTime"/>`<br>`  <xs:attribute name="not_to" type="xs:dateTime"/>` |

FIG. 4

(Use Case 1) This AC can only be used for playback.

```
<InML>
    <intention name="play">
        <conditions>
            <count number="100000"/>
        </conditions>
        <action name="refuse">
        </action>
    </intention>
</InML>
```

FIG. 5A (Use Case 2) This AC can be played up to 5 times before March 29, 2017. After March 1, 2017, it can only be played at the IP address 117.16.123.201. Otherwise, it should be deleted immediately.

```
<InML>
    <intention name="play">
        <conditions>
            <or>
                <and>
                    <count number="5"/>
                    <time to="2017-03-29T00:00:00"/>
                </and>
                <and>
                    <address ip="117.16.123.201"/>
                    <time from="2017-03-01T00:00:00"/>
                </and>
            </or>
        </conditions>
        <action name="destruct">
        </action>
    </intention>
</InML>
```

FIG. 5B (Use Case 3) This AC can be printed five times, and should then be deleted. It can also be played twice, after which further requests should be ignored.

```
<InML>
    <intention name="print">
        <conditions>
            <count number="5"/>
        </conditions>
        <action name="destruct">
        </action>
    </intention>
    <intention name="play">
        <conditions>
            <count number="2"/>
        </conditions>
        <action name="refuse">
        </action>
    </intention>
</InML>
```

FIG. 5C

| execution format header | active content header | embedded content | system engine code | intention engine code 1 | ... | intention engine code N |

FIG. 6

| | 0 | 4 | 8 |
|---|---|---|---|
| 0 | signature | the number of intention engine codes | size of active content header |
| 8 | embedded content offset | | embedded content size |
| 16 | system engine code offset | | system engine code size |
| 24 | intention engine code 1 offset | | intention engine code 1 size |
| | ⋮ | | ⋮ |
| NX8 +16 | intention engine code N offset | | intention engine code N size |

FIG. 7

ACTIVE CONTENT PLAYBACK APPARATUS AND ACTIVE CONTENT CREATION APPARATUS

CROSS REFERENCE TO RELATED APPLICATION

This application is a continuation-in-part application of co-pending U.S. application Ser. No. 15/177,677, filed Jun. 9, 2016, the disclosure of which is incorporated herein by reference. This application claims priority benefits under 35 U.S.C. § 1.119 to Korean Patent Application Nos. 10-2016-0003533 filed Jan. 12, 2016 and 10-2018-0165208 filed Dec. 19, 2018.

BACKGROUND OF THE INVENTION

Field of the Invention

The present invention relates to an active content playback apparatus and an active content creation apparatus and, more particularly to an active content playback apparatus and an active content creation apparatus, which enable virtualizing embedded content obtained by reflecting the intention of a producer distributing or creating content and virtually executing the embedded content according to the reflected intention while preventing the content from being leaked to the outside.

Description of the Related Art

Today's content is mostly digital content. Digital content causes copyright infringement problems under the current advanced Internet environment. Furthermore, it has become more difficult to protect the copyright of the owner as information and communication technologies have been developed.

Accordingly, various types of digital rights management (DRM) technologies have been developed and widely used in the digital business domain. The DRM framework can securely and transparently distribute digital content and efficiently manage copyrights of authors on the content distribution value chain.

The traditional DRM approach is conceptually simple, but actually has complex problems. Users are not familiar with such DRM system. For example, legitimate content users face a complex software installation process and also face a user interface that is difficult to understand. In addition, there is a problem that it is difficult to obtain compatibility between DRM systems because there is no de facto standard. Despite the problems of the DRM system, the DRM system has been widely used.

On the other hand, as it can be seen in that a lot of video streaming sites, personal blogs, and social media sites are flourishing, it is now an age when an individual can create content. Organizations or professional authors typically create content to generate revenue, while ordinary individuals create content for a variety of other purposes. For example, a content producer may monitor the popularity acquisition or the distribution of content, or may create content intended for limited sharing thereof.

DRM systems, which are difficult to use and are expensive, do not accurately reflect the intentions of individual producers. For example, some want privacy protection for the purpose of restricted sharing. Some want their photos to be shared only with their friends. Some hope to transfer copies of their scanned driver's license to an agency, expecting that their driver's license will be verified and then the scan thereof permanently destroyed.

As such, privacy protection has more importance and need than copyright protection for each individual. DRM systems may also be used for privacy protection, but have serious problems when being used by general individuals due to problems such as system complexity, incompatibility, cost, and the like.

SUMMARY OF THE INVENTION

Accordingly, the present invention has been made keeping in mind the above problems occurring in the prior art, and an object of the present invention is to provide an active content playback apparatus and an active content creation apparatus capable of controlling the execution of content distributed according to the intention of a content distributor.

In addition, the present invention is to provide an active content playback apparatus and an active content creation apparatus, capable of allowing content to be distributed to be embedded in an executable file and performing control so that the embedded content is executed according to a code embedded in the executable file and reflecting the intention of a distributor while being prevented from being leaked to the outside.

In addition, it is another object of the present invention to provide an active content playback apparatus and an active content creation apparatus which are configured to be implemented using a generally used player without using a dedicated player, thereby making it possible to be easily utilized with an economical cost.

In addition, the present invention is to provide an active content playback apparatus and an active content creation apparatus, capable of allowing an intention engine code for privacy protection to be created and embedded in an executable file according to a markup language configured according to the intention of a content producer and providing privacy protection according to the intention of the content producer when the intention engine code is executed in the playback apparatus.

It will be appreciated that the technical problems to be solved by the present invention are not limited to the above-mentioned technical problems and other technical subjects not mentioned will be apparent to those skilled in the art from the description below.

An active content playback apparatus according to an aspect of the present invention includes a storage storing active content including an active content header, embedded content, and an engine code, and a player program for executing the content; a memory temporarily storing data and program; and a central processing unit loading the active content into the memory according to an execution request for the active content and controlling an execution through a process of the player program of the embedded content loaded into the memory by executing the engine code included in the active content.

In the active content playback apparatus, the central processing unit, which executes the engine code, may call the player program by comparing an condition variable stored in the active content and a condition embedded in the engine code to execute the embedded content loaded into the memory and modify the condition variable to store the modified active content in the storage.

In the active content playback apparatus, the central processing unit may create a process of the player program and is provided to restrict a file I/O access to the embedded content by a process created by performing hooking on a file I/O API of the created process to a file I/O API set by the engine code.

In the active content playback apparatus, the central processing unit, which executes the engine code, may perform hooking on an OS API for creating a process, creates a process of the player program corresponding to the embedded content as a command that calls the OS API for opening a process of the player program corresponding to the embedded content, and perform hooking on at least one of file create API, file read API, and file write API used in the created process.

In the active content playback apparatus, the active content may include an execution format header, an active content header, embedded content, a system engine code, and at least one intention engine code, and the active content header may include offsets and sizes of the system engine code and the at least one intention engine code.

In the active content playback apparatus, when the file read API is called by the created process, the central processing unit may transmit a path of the embedded content loaded into the memory to the created process thereby enabling accessing the embedded content, upon satisfying a condition according to comparison between a read condition variable and a condition embedded in the engine code through the execution of the file read API hooked by the engine code of the active content.

In the active content playback apparatus, the central processing unit may provide other data to the created process instead of the embedded content loaded into the memory when the file write API is called by the created process.

In the active content playback apparatus, the at least one intention engine code and the system engine code may be execution codes created by parsing an InML language document written in an intention markup language capable of being represented by a condition, an intention, and an action at the time of dissatisfaction of the condition from a distributor for the embedded content.

An active content creation apparatus according to an aspect of the present invention includes a storage unit storing at least one content, an InML document, system engines, and intention engines; an engine code creation unit creating a system engine code and at least one intention engine code from the InML document using the system engines and the intention engines; and an active content creation unit creating active content including the system engine code, the at least one intention engine code, the content of the storage unit, and an active content header; wherein the active content is loaded into a memory of a playback apparatus according to an execution in the playback apparatus, and the content embedded in the active content is controlled to be executed by the intention engine code performed.

In the active content creation apparatus, the at least one intention engine code and the system engine code included in the active content may be execution codes created by parsing the InML document written in an intention markup language capable of being represented as a condition, an intention, and an action at the time of dissatisfaction of the condition from a distributer for the embedded content.

In the active content creation apparatus, the InML document may include a plurality of condition-intention items composed of the condition, the intention, and the action at the time of dissatisfaction of the condition, and the engine code creation unit may create a plurality of intention engine codes capable of being executed independently in the playback apparatus from the plurality of condition-intention items.

In the active content creation apparatus, the active content may include an execution format header, an active content header, embedded content, a system engine code, and at least one intention engine code, and the active-content header includes offsets and sizes of the system engine code and the at least one intention engine codes.

The active content playback apparatus and the active content creation apparatus according to the present invention have an effect of controlling the execution of content distributed according to the intention of a content distributor.

In addition, the active content playback apparatus and the active content creation apparatus according to the present invention have an effect that it is possible to allow content to be distributed to be embedded in an executable file and perform control so that the embedded content is executed according to a code embedded in the executable file and reflecting the intention of a distributor while being prevented from being leaked to the outside.

In addition, according to the present invention, there is an effect that the active content playback apparatus and the active content creation apparatus which are configured to be implemented using a generally used player without using a dedicated player, thereby making it possible to be easily utilized with an economical cost.

In addition, according to the present invention, there is an effect that the active content playback apparatus and the active content creation apparatus enables allowing an intention engine code for privacy protection to be created and embedded in an executable file according to a markup language configured according to the intention of a content producer and providing privacy protection according to the intention of the content producer when the intention engine code is executed in the playback apparatus.

The effects obtained by the present invention are not limited to the effects mentioned above, and other effects not mentioned can be clearly understood by those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which:

FIG. 4 is a diagram illustrating an exemplary InML schema;

FIGS. 5A, 5B, and 5C are diagrams illustrating examples of an InML document file configured using the InML schema of FIG. 4;

FIG. 6 is a diagram illustrating an exemplary format of active content;

FIG. 7 is a diagram illustrating an example of the format of an active content header;

DETAILED DESCRIPTION OF THE INVENTION

The above and other objects, features and advantages of the present invention will become more apparent from the following detailed description taken in conjunction with the accompanying drawings, so that those skilled in the art will readily understand the technical idea of the present invention. In the following description, well-known functions or constructions are not described in detail since they would obscure the invention in unnecessary detail. Hereinafter, preferred embodiments of the present invention will be described in detail with reference to the accompanying drawings.

Figure 1:
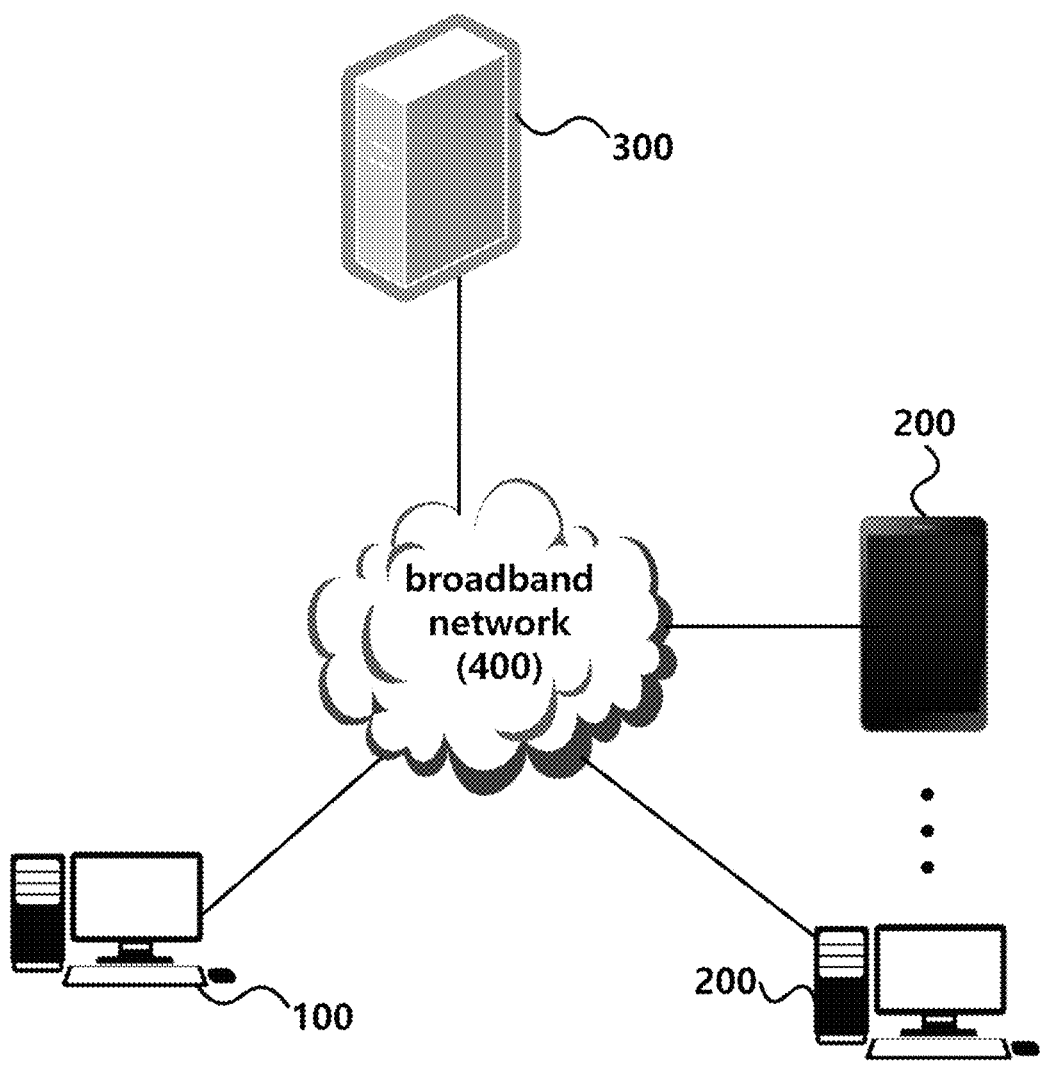
FIG. 1 is a diagram illustrating a configuration example of a connection between apparatuses of an active content distribution system.

FIG. 1 is a diagram illustrating a configuration example of a connection between apparatuses of an active content distribution system.

The active content distribution system of FIG. 1 represents an example of a system configuration and may have various modifications. For example, the active content distribution system may omit a content sharing server 300 as its component. Alternatively, in the active content distribution system, the creation and playback of the active content may be performed via a storage medium without the broadband network 400 and the content sharing server 300 as components, or by directly connecting the active content creation apparatus 100 and the active content playback apparatus 200 to each other.

Referring to FIG. 1, an active content distribution system includes at least one active content creation apparatus 100, at least one active content playback apparatus 200, a content sharing server 300, and a broadband network 400.

The active content creation apparatus 100 creates active content. The active content creation apparatus 100 may be, for example, a smart phone, a tablet PC, a notebook computer, a personal computer, or the like.

Whereas existing known content is passive content that is executed and modified by an external player, the active content according to the present invention has content visualized therein and is controlled such that the embedded content is executed (reproduced, copied, printed, etc.) according to the intention of the active content producer (distributor), the active content having a form (appearance) of an executable file.

The active content has existing passive content of control target embedded therein, and further includes an engine code for controlling the embedded content according to the intention of the producer so that the content is controlled through the engine code and is prevented from being leaked to the outside. This enables virtualization of the content and protecting content from various external attacks and threats.

The active content creation apparatus 100 creates the active content by configuring a header, and a system engine code and one or more intention engine codes to control the content according to the intention of the producer, in the content. The created active content may be formatted into an executable file (for example, an EXE file) under a known OS environment to be executed under a specific OS environment and to operate the system engine code and intention engine code to execute the content according to the intention of the producer.

Hereinafter, the active content creation apparatus 100 will be referred to as a "creation apparatus", and the creation apparatus 100 will be described in detail with reference to FIGS. 2 and 3.

The active content playback apparatus 200 is capable of performing the playback of the active content. The active content playback apparatus 200 is an apparatus capable of executing the active content, such as, for example, a smart phone, a tablet PC, a notebook computer, a personal computer, and the like.

The active content playback apparatus 200 may be configured such that the active content is executed in accordance with the provided operating system (OS) and the content embedded in the active content according to a header in the active content is executed according to the engine code configured according to the intention of the producer (distributer).

For example, the active content playback apparatus 200 may play, copy, or print the embedded content, or otherwise restrict or deny such playback, copying, and printing in accordance with condition variables or condition codes included in the engine code.

Hereinafter, the active content playback apparatus 200 will be referred to as a "playback apparatus", and the playback apparatus 200 will be described in detail with reference to FIG. 4.

The content sharing server 300 is a server that may share content. The content sharing server 300 is configured to receive various contents from the producer or the like and to share contents loaded on the server 300 with other users.

The content sharing server 300 may be various types of servers. For example, the content sharing server 300 may be a file sharing server, a blog server, a social network server, a web server, or the like. The content sharing server 300 may take various forms and preferably allow the active content according to the present invention to be shared with other users. As described above, the content sharing server 300 may be omitted according to the design example.

The broadband network 400 transmits and receives various data between the creation apparatus 100, the playback apparatus 200, and the content sharing server 300. The broadband network 400 enables transmitting and receiving communication packets between machines, apparatuses, terminals, servers, and/or devices according to a promised communication protocol. The broadband network 400 may include a mobile communication network, an Internet network, or the like, or a combination thereof.

Figure 2:
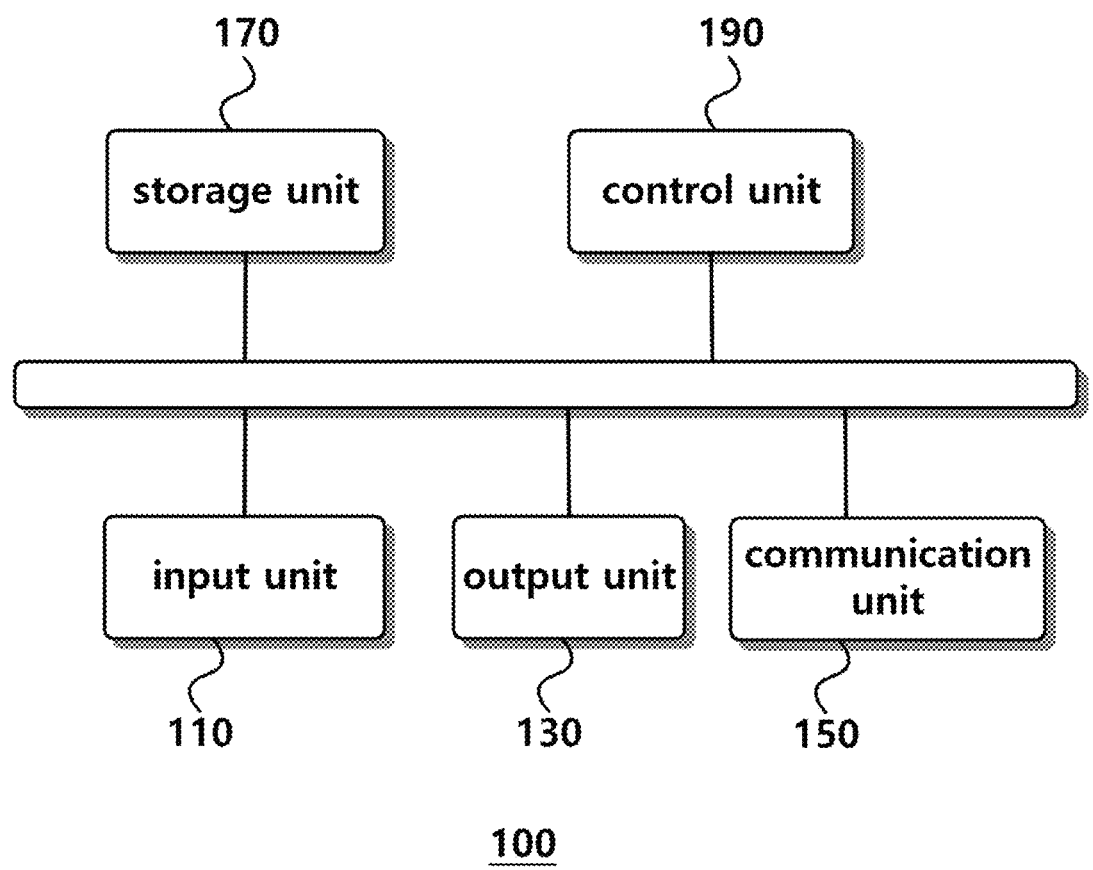
FIG. 2 is a block diagram illustrating an example of a creation apparatus.

FIG. 2 shows a block diagram illustrating an example of a creation apparatus.

The active content creation apparatus 100 of FIG. 2 preferably represents a functional block diagram, and each functional block has a hardware block or a component that is necessary for performing a corresponding function.

Referring to FIG. 2, the creation apparatus 100 includes an input unit 110, an output unit 130, a communication unit 150, a storage unit 170, and a control unit 190. Depending on the design example, some blocks of FIG. 2 may be omitted or other blocks not shown in FIG. 2 may be further included in the creation apparatus 100 of FIG. 2.

The input unit 110 includes a mouse, a keyboard, a microphone, a touch pad, a touch panel, and/or a light pen, and receives various inputs from a user. For example, the input unit 110 may receive various user inputs such as a creation request, a deletion request, a correction request, a program execution request, a document input, a document change, and the like of the active content and may transmit the user inputs to the control unit 190.

The output unit 130 includes a speaker, a display, an LED, and/or a buzzer, and outputs various sounds, voices, and/or video signals under the control of the controller 190. The output unit 130 may output, for example, an editor screen which may edit various markup languages, a parsing screen, a compilation result screen, a result sound, or the like.

The communication unit 150 includes a communication chipset for the purpose of connection to an Ethernet, a Wi-Fi and/or a mobile communication network (e.g., an LTE network), and transmits/receives various communication packets in wired or wirelessly. For example, the communication unit 150 may transmit a communication packet that indicates or contains the active content to the playback apparatus 200 or the content sharing server 300.

The storage unit 170 stores various data and programs. The storage unit 170 has a mass storage medium such as a volatile memory, a non-volatile memory, and/or a hard disk, and stores various data and programs that are necessary for creating the active content.

For example, the storage unit 170 stores at least one content capable of being embedded in the active content, intention markup language (hereinafter, referred to as "InMl") document indicating a control intention of the producer for the content to be embedded, system engines capable of being embedded within the active content as code, etc. according to the control intention, intention engines capable of being embedded within the active content as code, etc. according to the control intention, and active content creation program used to create the active content.

The content stored in the storage unit 170 is generally stored as a so-called passive content in the form of a file, and may be reproduced, copied or printed through a known player program or the like. The content may be, for example, an image file, a movie file, a music file, a recorded file, and the like.

An InML document (file) is a document for expressing a control intention by the active content producer. The InML document may be defined and interpreted by an InML schema (see FIG. 4) configured by the inventor of the present invention. The InML schema of FIG. 4 may be part of the overall schema.

As may be seen from FIG. 4, the InML document may have one or more intentions (see ① in FIG. 4), and each intention may have a condition and an action (see ② in FIG. 4) at the time of dissatisfaction of the condition. Each condition may have AND, OR, and NOT operators independently of each other (see ③ in FIG. 4).

FIGS. 5A, 5B, and 5C are diagrams illustrating examples of an InML document file configured using the InML schema of FIG. 4.

FIGS. 5A, 5B, and 5C show examples of three types of InML documents. The InML document in FIG. 5A is configured to play (intention) up to 100,000 times (condition) and reject (action) the playback when exceeding 100,000 times.

FIG. 5B shows the InML document is configured to play (intention) at the IP address 117.16.123.201 (condition) up to 5 times from Mar. 1, 2017 until Mar. 28, 2017 and perform destruction (action) at the time of dissatisfaction of the condition.

FIG. 5C shows the InMl document is configured to allow printing (intention) up to 5 times (condition) and perform destruction (action) when exceeding 5 times, and allow playing (intention) and reject (action) the playback when exceeding 2 times.

As such, each intention may be playback, copying, printing, etc., or any other type of purpose.

As may be seen from FIGS. 5A, 5B, and 5C, the InML document takes one or more pseudo code formats as following:

```
if (condition)
    allow (intention)
else
    perform (action)
```

As may be seen from FIGS. 5A to 5C, the InML document includes at least one condition-intention item (see ④ in FIGS. 5A, 5B, and 5C) configured of a condition, an intention, and an action at the time of dissatisfaction of the condition.

Each InML document may be parsed according to the InML schema and then compiled into executable engine code in an operating system (OS). The term "compile" here refers to or includes the process of translating (translation or interpretation into machine code or virtual code) or transform (transformation into machine code or virtual code) the InML language into another language.

The system engines form the basic components of the intention engine in the playback apparatus 200 and handle various control and management functions. The system engines may be configured in a modular format and embedded in the active content. The system engines are configured in the form of dynamic link libraries (DLLs) so that the components necessary for configuring the intention engine may be extracted and embedded within the active content.

Intention engines are components for implementing a condition, an intention, an action at the time of dissatisfaction in condition-intention item of the InMl document and include pre-compiled libraries (e.g., DLL). For example, a play intention engine is a component required to control the active content according to the definition of a play intention.

The active content creation program creates the active content using InML document, content, system engines, and intention engines. The active content creation program is loaded in the control unit 190 and creates the active content using various data stored in the storage unit 170 to store the created active content in the storage unit 170 or transmit the creates active content to the broadband network 400 via the communication unit 150.

The control unit 190 controls the creation apparatus 100. The control unit 190 includes at least one execution unit capable of executing the instruction code of the program and loads the program stored in the storage unit 170 to control various blocks according to the code of the loaded program.

The control unit 190 loads the active content creation program of the storage unit 170 and combines the InML document, content, system engines, and intention engines according to the loaded creation program to create the active content.

Figure 3:
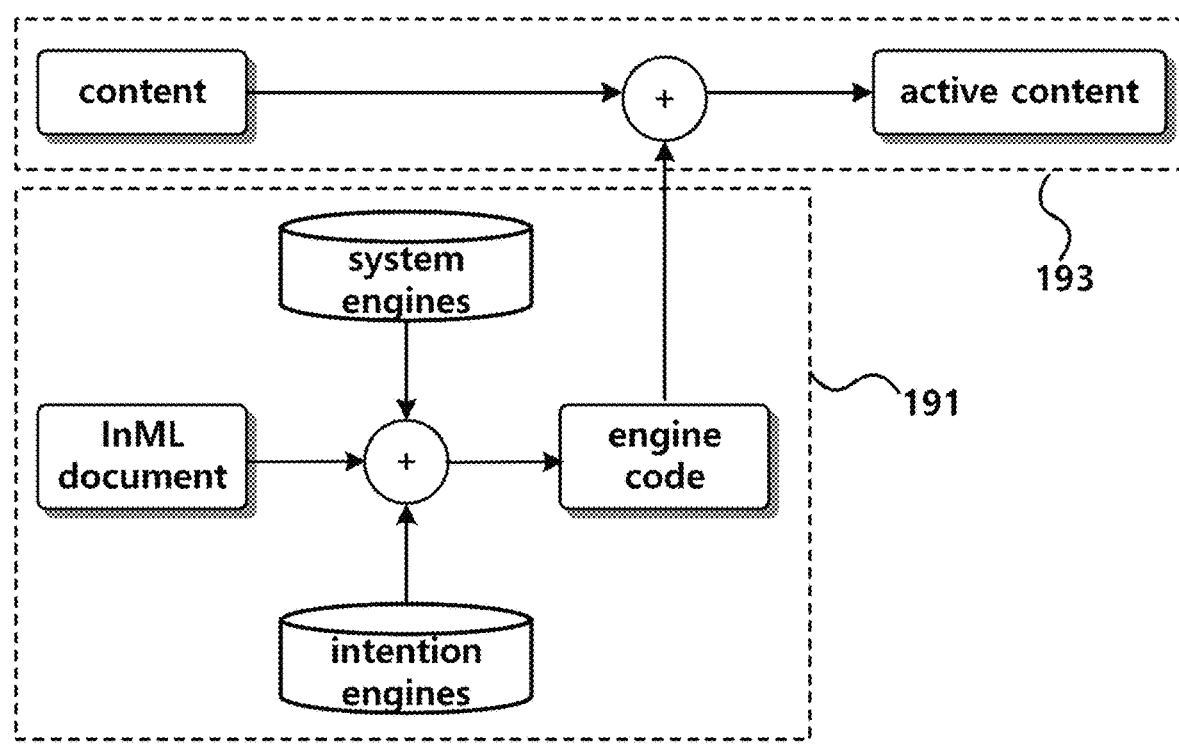
FIG. 3 is a block diagram illustrating a detailed configuration for creating active content.

FIG. 3 is a block diagram illustrating a detailed configuration for creating active content. The detailed block diagram of FIG. 3 is configured using the active content creation program that is configured in the creation apparatus 100 and preferably performed by the control unit 190. The detailed block diagram of FIG. 3 is configured by allowing the controller 190 to execute the code of the active content creation program and control the other blocks of FIG. 2 through the program code.

First, the producer (distributor) creates an InML document for indicating the intention of the active content through the input unit 110 or selects the InML document from the storage unit 170, and also creates content to be included in the active content or selects the content from the storage unit 170.

The engine code creating unit 191 included in the active content creation program and operated according to the execution of the program code in the control unit 190 creates an engine code that is an executable engine for reflecting the intention (condition-intention item) in the InML document by using the InML document created or selected by the producer and the system engines and the intention engines of the storage unit 170.

The engine code creating unit 191 parses the InML document for the embedded content described in the markup language capable of being represented by a condition, an intention, and an action at the time of dissatisfaction of the condition from the distributor according to an InML schema, extracts intention engines and system engines corresponding to each of the condition-intention items of the InML document from the storage unit 170, and creates system engine code and one or more intention engine codes necessary for the execution in the playback apparatus 200 through compilation. The system engine code and intention engine code may be codes capable of being executable in the playback apparatus 200.

When the InML document includes multiple condition-intention items, the engine code creating unit 191 may create multiple intention engine codes capable of being executed independently at the playback apparatus 200 from multiple condition-intention items.

The system engine code may include, for example, a basic library necessary for performing functions of intention engine codes or control codes for controlling intention engine codes. Each intention engine code includes a program code necessary for execution in the playback apparatus 200 of each condition-intention item, such as, for example, a program code related to an intention, a condition, and an action at the time of dissatisfaction, initial condition variable, and the like.

The intention engine code include a code for controlling an external player of the playback apparatus 200 and/or providing the embedded content to an external player and preventing the content from being leaked. The intention engine codes include, for example, a code for calling an external player, a code for notifying a path in the memory 209 of the embedded content, and a code for preventing the content from being leaked. The intention engine code may include a code for performing hooking on a system call (e.g., file I/O) of the playback apparatus 200 to prevent the content from being leaked and notify a path in the memory 209.

The active content creating unit 193 included in the active content creation program and operated according to the execution of the program code in the controller 190 creates the active content by combining a system engine code created by the engine code creating unit 191, one or more intention codes, and content and creating a header (an execution format header and an active content header).

FIG. 6 illustrates an exemplary format of the active content, wherein the active content created by the active content creating unit 193 includes an execution format header, an active content header, embedded content, a system engine code, and one or mode intention engine codes.

The execution format header is a header that is to be recognized as an executable file by the operating system of the playback apparatus 200, and may include or display, for example, a portable executable (PE) header and sections.

The active content header stores information that allows the embedded content, the system engine code, and the intention engine code to be specified within the active content.

FIG. 7 illustrates an example of a format of an active content header, wherein the active content header includes information such as a signature (e.g., 0x4341) indicating the active content header, the number of intention engine codes included, a size of the active content header, embedded content offset, embedded content size, system engine code offset, system engine code size, intention engine code 1 offset, intention engine code 1 size, . . . , intention engine code N offset, and intention engine code N size.

The active content header is configured by the active content creating unit 193, and the position of the content embedded in the memory 209 of the playback apparatus 200 and positions of the system engine code and intention engine code may be specified and operated through the active content header.

The created active content may be stored in the storage unit 170 and then transmitted to the playback apparatus 200 via the broadband network 400. The active content, which is recognized as an executable file, is loaded into the memory 209 of the playback apparatus 200 according to the execution in the playback apparatus 200, so that it is possible to control the execution for the embedded content by the intention engine codes included in the active content. In addition, the content included in the active content is virtualized within the active content, thereby preventing it from being leaked to the outside and avoiding various side effects due to external leaks or attacks.

Figure 8:
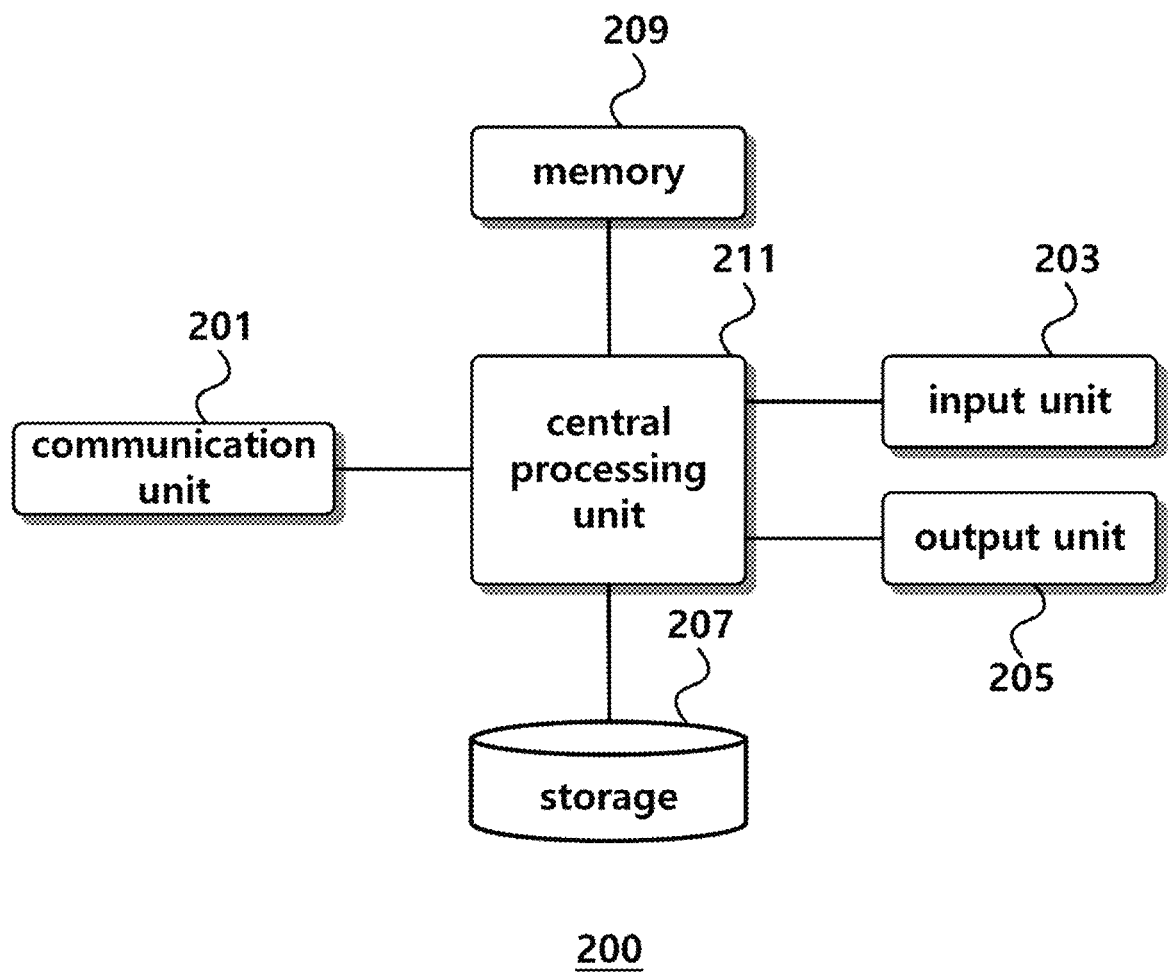
FIG. 8 is a block diagram illustrating an example of a playback apparatus.

FIG. 8 is a block diagram illustrating an example of a playback apparatus 200.

Considering the active content playback apparatus 200 with reference with FIG. 8, the playback apparatus 200 includes a communication unit 201, an input unit 203, an output unit 205, a storage 207, a memory 209, and a central processing unit 211. Some blocks of FIG. 8 may be omitted or another block not shown in FIG. 8 may be further included in the playback apparatus 200 of FIG. 8, depending on the design example.

The communication unit 201 includes a communication chipset for the purpose of connection to an Ethernet, a Wi-Fi and/or a mobile communication network (for example, an LTE network), and transmits/receives various communication packets in wired or wirelessly. For example, the communication unit 201 may receive a communication packet representing or containing the active content from the creation apparatus 100 or the content sharing server 300.

The input unit 203 includes a mouse, a keyboard, a microphone, a touch pad, a touch panel, and/or a light pen to receive various inputs from a user. For example, the input unit 203 may receive a selection (play) request of the active content.

The output unit 205 includes a speaker, a display, an LED, a buzzer, a printer interface, and the like, to output various sounds, voices, images, and/or printer signals under the control of the central processing unit 211. For example, the output unit 205 may output various data according to playback, copying, printing, etc. of the content embedded in the active content.

The storage 207 includes a hard disk, a USB memory, a portable storage medium, and the like, to store various data and programs. The storage 207 is recognized as a drive or a disk by an operating system performed in the central processing unit 211 and may permanently store various data or programs through a file system.

The storage 207 stores at least one active content including the active content header, the embedded content, the engine code, etc., according to a specified format and player programs capable of playing the content. The player program may be, for example, an image program for decoding an image and displaying the image on an output unit 205, a printing program for outputting printing data to a printer, a copying program for copying a file, and the like. The player program may perform only one function (for example, an image viewer) or perform various functions together (for example, image viewer, printing, copying, etc.).

The storage 207 may further include other control management programs. The control management program may operate or control various programs according to user input.

The memory 209 includes volatile memory and temporarily stores data and programs. For example, the memory 209 may temporarily store the active content or the player program, and the active content or the player program may be executed by the central processing unit 211.

The central processing unit 211 includes one or more execution units capable of executing instruction codes of a program to execute various programs stored in the storage 207.

A central processing unit 211 executing a control management program or the like may display various icons that are executable via the output unit 205 and receive an execution request for a specific icon via the input unit 203. The central processing unit 211 may perform or play the program or content corresponding to the icon of the execution request.

The central processing unit 211 receiving the execution request for the active content loads the active content from the storage 207 into the memory 209 and controls the execution of the content embedded in the active content through the execution of the engine code included in the active content. The central processing unit 211, which executes the engine code, may perform the specified function (intention) or perform the designated action according to whether the condition of the engine code is satisfied or not.

In performing the specified function (e.g., play, copy, printing, etc.), the central processing unit 211 performs a process of the player program stored in the storage 207 and provides the intended function through the output unit 205 by controlling the execution of the embedded content in the process.

The specific control and implementation performed in the central processing unit 211 will be now described in detail with reference to FIG. 9.

Figure 9:
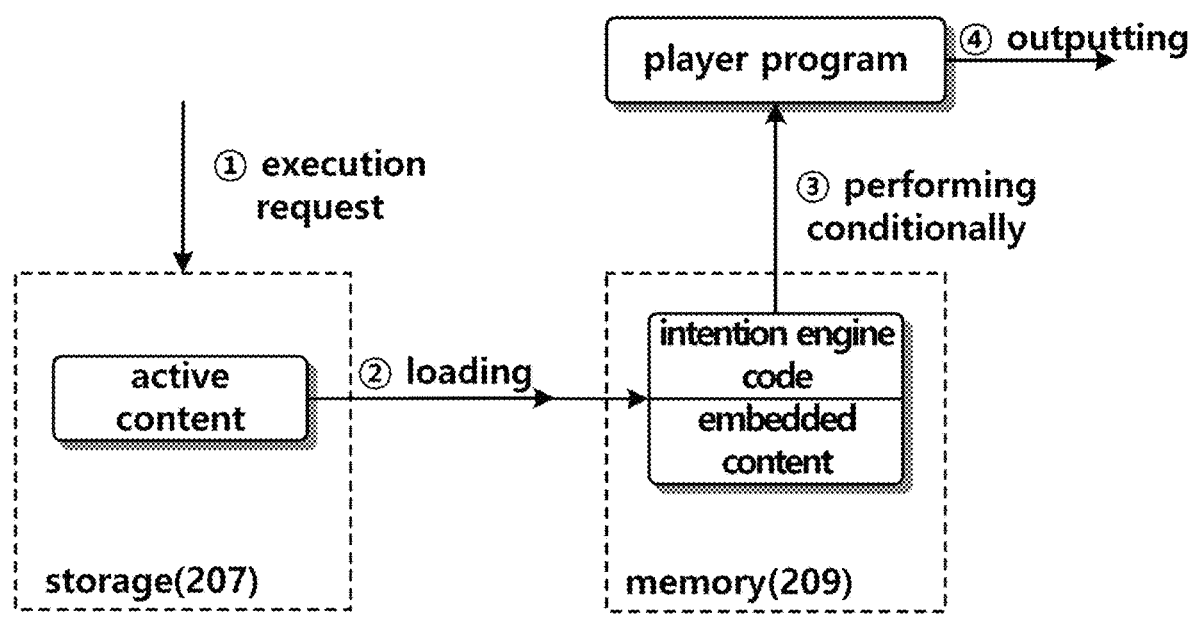
FIG. 9 is a diagram illustrating an operation process of active content in a playback apparatus.

FIG. 9 is a diagram illustrating an operation process of the active content in the playback apparatus 200.

The user of the playback apparatus 200 may select a displayed icon through the output unit 205 and input an execution request of the selected icon through the input unit 203 (see ① in FIG. 9).

The central processing unit 211 executing the control management program loads, into the memory 209, the active content stored in the storage 207 to be recognized as an executable file, according to the execution request of the active content (see 2 in FIG. 9).

The central processing unit 211 recognizes the active content as the executable file according to the execution format header and loads the active content header, the embedded content, the system engine code, and one or more intention engine codes in the active content into the memory 209, so that the system engine code and/or intention engine codes may be executed in the central processing unit 211.

The central processing unit 211, which executes the engine code, compares the condition variables embedded (for example, initially set or hereafter changed as the function is performed) in the intention engine code with condition embedded within the intention engine code as a program code, and calls a player program for performing the designated intention when the condition is satisfied (see ③ of FIG. 9). The engine code and the player program may send and receive various messages through known communication between programs or processes.

The player program to be executed receives the embedded content under the control of the intention engine codes of the active content, performs the function intended by the distributor for the embedded content, and outputs the result through the output unit 205 or the like (See ④ of FIG. 9).

The player program may virtualize the content by receiving the content through the intention engine code of the active content without accessing the content directly from the storage 207. This makes it impossible to directly access the storage 207 through the file I/O and possible to access the memory 209 in accordance with the management of the intention engine code so that the embedded contents is prevented from being leaked to the outside, thereby enabling dynamic management according the intention of the distributor.

The intention engine code provides the function to the user through the player program and is stored in the active content by modifying the necessary condition variables. The modified active content may then be stored in the storage 207.

Also, the process of FIG. 9 is preferably implemented using a common player that is generally used without a dedicated program such as DRM.

Figure 10:
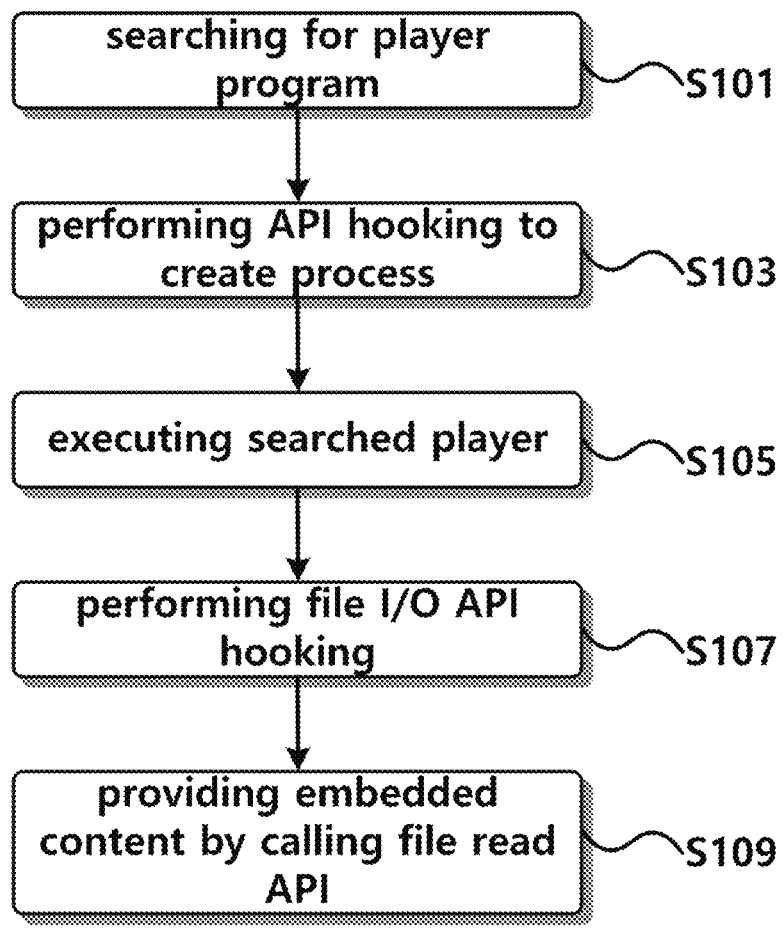
FIG. 10 is a flow diagram illustrating an example of control for searching for a player program in the playback apparatus and for protecting content exposed to a common player program through a hooking method.

FIG. 10 is an exemplary flow diagram illustrating control for searching the playback apparatus 200 for a player program and for protecting content exposed to a common player program through a hooking method.

The control flow of FIG. 10 is performed by the central processing unit 211 and is performed according to the execution of the engine code of the active content (for example, a combination of system engine code and intention engine code).

First, (the engine code of) the central processing unit 211 searches for a player program to be used for the embedded content (S101).

For example, the intention engine code may acquire a command that may execute a player corresponding to an extension (for example, jpg, etc.) of the embedded content in the window registry of the playback apparatus 200. The intention engine code may call the corresponding common player program by acquiring path and command of a player for a specific extension in the Windows registry path and outputting the path and command to the operating system.

The intention engine code, which performs printing, calls EnumPrinters ( ) which is, for example, a Windows application programming interface (API), to bring a list of installed printers and allow the user to select a printer. In this process, the intention engine code may identify and remove a virtual printer from the list of printers, output a list in which the virtual printer is removed through the output unit 205, select a specific printer according to the user selection through the input unit 203, and acquire the corresponding printer handler.

Then, the central processing unit 211, which executes the engine code, performs OS API hooking to create the process of the retrieved player program (S103).

For example, the central processing unit 211 performs CreateProcess API hooking in explorer.exe through a known hooking method. Explorer.exe provides various system functions such as search, access and execution of the file system in a graphical user interface (GUI) environment, and a specific process is created through the CreateProcess API.

The central processing unit 211, which executes the engine code, calls the command to operate the searched player (or printer) and executes the searched player (S105).

For example, the central processing unit 211 uses a path and command to open (execute) the process of the searched player (or printer) to execute the player, and accordingly, a process of the player is created via the hooked CreateProcess API.

The created process may be a process of the player program that is used for playback, copying, printing, etc. of the content embedded in the active content and set according to the intention of the intention engine code.

The central processing unit 211, which executes the engine code, performs hooking on a file input/output (I/O) (or processing) API used in the created process (S107).

For example, the central processing unit 211, which executes the intention engine code, performs hooking on at least one API of file create (e.g., CreateFile), file read (e.g., ReadFile), file write (e.g., WriteFile) in the created process.

The central processing unit 211 is provided to jump to the corresponding code position of the intention engine code at the start point of the file create API, the file read API, and/or the file write API in the created process, so that the function of each file I/O API is be limited or restricted through the intention engine code thereby virtualizing the embedded content.

In this way, by performing hooking on the file I/O API, which requires reading and modification of the content, the restricted file I/O access to the embedded content is performed through the intention engine codes, and content access restriction may be dynamically allocated according to condition.

The player process or the printer process outside the engine code calls the file read API to access the content, and (the central processing unit 211 of) the intention engine codes provides (S109) or denies providing the embedded content loaded into the memory 209 according to the condition thereof through the hooked file read API.

For example, a file read API hooked by the intention engine code is called according to the call of the file read API in the player or printer process, and the intention engine codes corresponding to the file read API compares read condition variables set therein with condition in the intention engine code and transmits a path of the embedded content loaded into the memory 209 and a size (or content) of the embedded content to the player or printer process through message passing or interprocess communication when the condition is satisfied. Accordingly, the player or printer process may access the embedded content of the memory 209 using information on the path and size transmitted.

Through such file I/O hooking, the path and file name are not exposed to the storage 207 thereby protecting the content, and a dynamic path or the like is provided from the memory 209, so that the player and the like may dynamically perform the virtualized content according to the intention of the distributor (producer).

On the other hand, a player process or a printer process outside the engine code calls a file write API for modifying contents, and via the hooked file write API, (the central processing unit 211 of) the intention engine codes may provide other data (e.g., garbage data) instead of the embedded content loaded into the memory 209 to the process. Thereafter, the player or printer process may process the file write through other data. Alternatively, the engine code performing hooking on the file write API may make the file write API deactivating.

As discussed above, the embedded content is not accessible directly from storage and is protected by the intention engine code in the memory and executed according to its intention when meeting the conditions.

It will be understood by those skilled in the art that various substitutions, modifications, and changes in form and details may be made therein without departing from the spirit and scope of the invention, and thus the present invention is not limited by the above-described embodiments and accompanying drawings.

What is claimed is:

1. An active content playback apparatus, comprising:
a storage storing active content including an active content header, embedded content including a condition and an intention of a producer or distributor of the active content for controlling a use of the active content with respect to digital rights management (DRM), an engine code configured to control a player program based on the condition and the intention, and the player program for executing the content;
a memory temporarily storing data and program; and
a central processing unit loading the active content into the memory according to an execution request for the active content and controlling an execution through a process of the player program of the embedded content loaded into the memory by executing the engine code included in the active content;
wherein the central processing unit, which executes the engine code, calls the player program by comparing a condition variable stored in the active content and a condition, corresponding the condition of the embedded content, embedded in the engine code to execute the embedded content loaded into the memory and modifies the condition variable to store modified active content in the storage.

2. The apparatus of claim 1, wherein the central processing unit creates a process of the player program and is provided to restrict a file I/O access to the embedded content by a process created by performing hooking on a file I/O API of the created process to a file I/O API set by the engine code.

3. The apparatus of claim 1, wherein the central processing unit, which executes the engine code, performs hooking on an OS API for creating a process, creates a process of the player program corresponding to the embedded content as a command that calls the OS API for opening a process of the player program corresponding to the embedded content, and performs hooking on at least one of file create API, file read API, and file write API used in the created process.

4. The apparatus of claim 1, wherein the active content further includes an execution format header, and the engine code includes a system engine code and at least one intention engine code, and
the active content header includes offsets and sizes of the system engine code and the at least one intention engine code.

5. The apparatus of claim 3, wherein when the file read API is called by the created process, the central processing unit transmits a path of the embedded content loaded into the memory to the created process thereby enabling accessing the embedded content, upon satisfying a condition according to comparison between a read condition variable and a condition, corresponding the condition of the embedded content, embedded in the engine code through the execution of the file read API hooked by the engine code of the active content.

6. The apparatus of claim 3, wherein the central processing unit provides other data to the created process instead of the embedded content loaded into the memory when the file write API is called by the created process.

7. The apparatus of claim 4, wherein the at least one intention engine code and the system engine code are execution codes created by parsing an InML language document written in an intention markup language representing the condition, the intention, and an action at a time of dissatisfaction of the condition from the distributor for the embedded content.

8. An active content creation apparatus, comprising:
a storage unit storing at least one content, an InML document, system engines, and intention engines, the InML document including a condition and an intention of a producer or distributor of active content for controlling a use of the active content with respect to DRM;
an engine code creation unit creating a system engine code and at least one intention engine code from the InML document using the system engines and the intention engines, the system engine code and the at least one intention code being configured to control a playback apparatus based on the condition and the intention; and
an active content creation unit creating the active content including the system engine code, the at least one intention engine code, the content of the storage unit, and an active content header;
wherein the active content is loaded into a memory of the playback apparatus according to an execution in the playback apparatus, and the content embedded in the active content is controlled to be executed by the intention engine code performed, and
wherein the at least one intention engine code and the system engine code included in the active content are execution codes created by parsing the InML document, the InML document being written in an intention markup language representing the condition, the intention, and an action at a time of dissatisfaction of the condition from a distributer for the embedded content.

9. The apparatus of claim 8, wherein the InML document includes a plurality of condition-intention items composed of the condition, the intention, and the action at the time of dissatisfaction of the condition, and
the engine code creation unit creates a plurality of intention engine codes capable of being executed independently in the playback apparatus from the plurality of condition-intention items.

10. The apparatus of claim 8, wherein the active content further includes an execution format header, and the active-content header includes offsets and sizes of the system engine code and the at least one intention engine code.

11. An active content playback method executed in an apparatus having a central processing unit and a storage for storing active content including an active-content header, embedded content including a condition and an intention of a producer or distributor of the active content for controlling a use of the active content with respect to DRM, an engine code configured to control a player program based on the condition and the intention, and the player program for executing the content,
the method including loading the active content into a memory according to an execution request of the active content and controlling execution through a process of the player program of the embedded content loaded in the memory by executing an engine code included in the active content;
wherein the central processing unit, which executes the engine code, calls the player program by comparing a condition variable stored in the active content and a condition, corresponding the condition of the embedded content, embedded in the engine code to execute the embedded content loaded into the memory and modifies the condition variable to store modified active content in the storage.

12. An active content creation method, comprising:
an engine code creation step of creating a system engine code and at least one intention engine code, the system engine code and the at least one intention code being configured to control a playback apparatus based on a condition and an intention of a producer or distributor of active content for controlling a use of the active content with respect to DRM, from an InML document including the condition and the intention, using system engines and intention engines; and
an active content creation step of creating the active content including the system engine code and the at least one intention engine code created in the engine code creation step, and content and an active content header of a storage unit,
wherein the active content is loaded into a memory of the playback apparatus according to an execution in the playback apparatus, and the content embedded in the active content is controlled to be executed by the intention engine code performed, and
wherein the at least one intention engine code and the system engine code included in the active content are execution codes created by parsing the InML document, the InML document being written in an intention markup language representing the condition, the intention, and an action at a time of dissatisfaction of the condition from a distributer for the embedded content.

* * * * *